US008384703B2

(12) United States Patent
Maki et al.

(10) Patent No.: US 8,384,703 B2
(45) Date of Patent: Feb. 26, 2013

(54) LIQUID CRYSTAL DISPLAY DEVICE

(75) Inventors: Masahiro Maki, Mobara (JP); Hideo Sato, Hitachi (JP); Hiroyuki Abe, Chiba (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 621 days.

(21) Appl. No.: 12/634,727

(22) Filed: Dec. 10, 2009

(65) Prior Publication Data

US 2010/0149155 A1 Jun. 17, 2010

(30) Foreign Application Priority Data

Dec. 11, 2008 (JP) ................................ 2008-316269

(51) Int. Cl.
*G06F 3/038* (2006.01)

(52) U.S. Cl. ......................................... 345/211; 345/87

(58) Field of Classification Search ........................ None
See application file for complete search history.

(56) References Cited

U.S. PATENT DOCUMENTS 7,468,720 B2 * 12/2008 Kim ............................. 345/100
8,164,562 B2 * 4/2012 Lee et al. ...................... 345/100
2008/0136801 A1 * 6/2008 Shie ............................. 345/204

FOREIGN PATENT DOCUMENTS

JP 2004-061670 2/2004
JP 2006-276541 10/2006

* cited by examiner

*Primary Examiner* — Jason Olson
(74) *Attorney, Agent, or Firm* — Antonelli, Terry, Stout & Kraus, LLP.

(57) ABSTRACT

In a liquid crystal display device which arranges a drive circuit on left and right sides of a display region in a two-split manner, flickering at an edge of a screen can be reduced. In a liquid crystal display device which arranges first and second counter electrode drive circuits on left and right sides of a display region respectively, during an arbitrary 1 frame period, a first counter electrode signal drive circuit 3L applies a first voltage to at least one counter electrode signal line portion CX1, CX3, . . . CXn−1 and a second voltage different from the first voltage to at least one counter electrode signal line portion CX1, CX3, . . . CXn−1, and a second counter electrode signal drive circuit 3R applies the first voltage to at least one counter electrode signal line portion CX2, CX4, . . . CXn and the second voltage to at least one counter electrode signal line portion CX2, CX4, . . . CXn.

4 Claims, 9 Drawing Sheets

LIQUID CRYSTAL DISPLAY DEVICE

CROSS-REFERENCE TO RELATED APPLICATION

The present application claims priority from Japanese application JP 2008-316269 filed on Dec. 11, 2008, the content of which is hereby incorporated by reference into this application.

BACKGROUND OF THE INVENTION

1. Field of the Invention

The present invention relates to a liquid crystal display device, and more particularly to a liquid crystal display device in which a drive circuit is formed on a liquid crystal substrate.

2. Background Art

An active-matrix-type liquid crystal display device has been popularly used as a monitor of a personal computer, a television receiver set, an information display device of portable equipment or the like. The liquid crystal display device has the structure where a liquid crystal layer is sandwiched between a pair of substrates made of glass or the like on which pixel electrodes and counter electrodes are formed. By applying a voltage between the pixel electrodes and counter electrodes, the alignment direction of liquid crystal is changed. In this manner, by allowing the pixel electrodes and the counter electrodes to function as optical switching elements, an image is formed.

When the liquid crystal layer receives the application of the same voltage for a long time, the alignment direction of liquid crystal is fixed so that so-called burning occurs in the liquid crystal display device. To avoid this burning, in the liquid crystal display device, it is necessary to invert positive and negative polarities of a voltage applied to the liquid crystal layer for every fixed time, typically for every frame. Here, not only by alternately changing a voltage applied to the pixel electrode between two potentials consisting of a high potential and a low potential but also by alternately changing a voltage applied to the counter electrode between two potentials consisting of a high potential and a low potential, it is possible to decrease a width of the voltage applied to the pixel electrode thus reducing the power consumption.

As a method for changing a voltage applied to the counter electrode, several methods have been known. As such methods, a frame inversion method where voltages applied to all counter electrodes are set to the same potential, and the potential is changed for every frame, a line inversion method where a voltage having the same potential is applied to counter electrodes along a row (line) of pixels, and a voltage to be applied to the counter electrodes is changed for every row, a column inversion method where a voltage having the same potential is applied to counter electrodes along a column of pixels, and voltages to be applied to counter electrodes are changed for every column, a dot inversion method where voltages applied to counter electrodes of neighboring pixels are changed and the like are named. Among these methods, a line inversion method is superior to other methods in view of quality of an image display and easiness in forming a drive circuit.

JP-A-2006-276541 discloses a liquid crystal display device adopting a line inversion method where a counter electrode drive circuit is provided for every counter electrode signal line.

Further, in a so-called system-on-glass liquid crystal display device which forms a drive circuit per se on a liquid crystal substrate, an area which the drive circuit occupies on the substrate is decided depending on a scale of the drive circuit. In narrowing a picture frame of the liquid crystal display device or miniaturizing the liquid crystal display device, it may be possible to arrange a drive circuit on left and right sides of a display region in which pixels are formed in a two-split manner. By adopting such a constitution, a scale of the two-split circuit arranged on each lateral side of the display region is substantially halved compared to a case where the drive circuit is arranged on either one side of the display region.

JP-A-2004-61670 discloses a liquid crystal display device in which a gate driver circuit is arranged on left and right sides of a display region in a two-split manner (see FIG. 8 and the like).

FIG. 8A and FIG. 8B are views schematically showing a liquid crystal display device 1 which adopts a line inversion method and arranges a drive circuit on left and right sides of a display region 6 in a two-split manner. The display region 6 is a region for displaying an image and a plurality of pixels are formed in the display region 6. Here, assume that n-pieces of pixels are arranged in the longitudinal direction. On left and right sides of these pixels, a counter electrode signal drive circuits 3L, 3R which control voltages applied to counter electrode signal line portions CX1 to CXn are arranged respectively. The counter electrode signal line portions CX1 to CXn are made conductive with counter electrode portions of pixels within the display region 6, and voltages outputted from the counter electrode signal drive circuits 3L, 3R are applied to the respective counter electrode portions through the counter electrode signal line portions CX1 to CXn. As shown in the drawing, the odd-numbered counter electrode signal line portions CX1, CX3, . . . CXn−1 counted from an upper edge of the display region 6 are connected to the counter electrode signal drive circuit 3L arranged on the left side of the display region 6. On the other hand, the even-numbered counter electrode signal line portions CX2, CX4, . . . CXn counted from the upper edge of the display region are connected to the counter electrode signal drive circuit 3R arranged on the right side of the display region 6. In the drawing, symbol H or L with parenthesis which is affixed to an end of symbol CX1, CX2, . . . CXn indicative of the counter electrode signal line portion indicates a voltage applied to the counter electrode signal line portions CX1 to CXn, wherein H expresses the application of a high-potential voltage, and L expresses the application of a low-potential voltage.

FIG. 8A shows a state of the counter electrode signal line portions CX1 to CXn of the liquid crystal display device 1 in an odd-numbered frame. As can be clearly understood from the drawing, a high-potential voltage is applied to all odd-numbered counter electrode signal line portions CX1, CX3, . . . CXn−1 which are connected to the counter electrode signal drive circuit 3L, while a low-potential voltage is applied to all even-numbered counter electrode signal line portions CX2, CX4, . . . CXn which are connected to the counter electrode signal drive circuit 3R.

Further, FIG. 8B shows a state of the counter electrode signal line portions CX1 to CXn of the liquid crystal display device 1 in an even-numbered frame. In this case, a low-potential voltage is applied to all odd-numbered counter electrode signal line portions CX1, CX3, . . . CXn−1, and a high-potential voltage is applied to all even-numbered counter electrode signal line portions CX2, CX4, . . . CXn.

That is, as shown in these drawings, when the counter electrode signal line portions CX1 to CXn are simply connected such that the counter electrode signal line portions CX1 to CXn are connected to the left and right counter electrode signal drive circuits 3L, 3R alternately, the same potential is applied to all counter electrode signal line portions CX1 to CXn connected to the counter electrode signal drive circuit 3L, 3R on either left or right side.

In general, the counter electrode signal line portions CX1 to CXn are formed of a transparent conductive thin film such as an ITO (Indium Tin Oxide) thin film. However, such a transparent conductive thin film has relatively high resistance. Accordingly, although the counter electrode signal line portions CX1 to CXn exhibit a high voltage value at a position near the counter electrode signal drive circuits 3L, 3R to which the counter electrode signal line portions CX1 to CXn are connected, the larger a distance from the counter electrode signal drive circuits 3L, 3R, the more the voltage is lowered. This phenomenon is observed as lowering of brightness of pixels at positions remote from the counter electrode signal drive circuits 3L, 3R.

Further, in the line inversion method, a voltage applied to the counter electrode portions is changed for every frame. Here, being influenced by parasitic capacitance generated between a thin film transistor and the counter electrode portion arranged in a pixel, the characteristics of the thin film transistor is changed. Accordingly, a voltage value written by the thin film transistor differs between a case where a high-potential voltage is applied to the counter electrode portion and a case where a low-potential voltage is applied to the counter electrode portion. Assume that an n-MOSFET (Metal Oxide Semiconductor Field Effect Transistor) is used as a thin film transistor, this phenomenon is observed as lowering of brightness of the pixel when the high-potential voltage is applied to the counter electrode portion and as the increase of brightness of the pixel when the low-potential voltage is applied to the counter electrode portion.

FIG. 9A to FIG. 9C are graphs showing the brightness distribution in the lateral direction of the pixels of the liquid crystal display device 1 shown in FIG. 8A and FIG. 8B.

In the drawing, a position Y in the lateral direction in the display region 6 of the liquid crystal display device 1 is taken on an axis of abscissas, and the brightness L of the pixel is taken on an axis of ordinates. Positions at left and right ends of the graph correspond to positions at left and right edges of the display region 6.

FIG. 9A shows the brightness distribution of the pixels in the liquid crystal display device 1 in an odd-numbered frame, and corresponds to FIG. 8A. In the drawing, a curve 20 indicates the brightness distribution of the pixel corresponding to the odd-numbered counter electrode signal line portions CX1, CX3, . . . CXn−1. In this case, a voltage is supplied to the counter electrode signal line portions CX1, CX3 . . . CXn−1 from the left counter electrode signal drive circuit 3L and hence, the brightness distribution is lowered rightward as shown in the drawing. Further, a high-potential voltage is supplied to the odd-numbered counter electrode signal line portions CX1, CX3, . . . CXn−1 and hence, the brightness as a whole is slightly lowered. To the contrary, with respect to a curve 21 which indicates the brightness distribution of the pixel corresponding to the even-numbered counter electrode signal line portions CX2, CX4, . . . CXn, a low-potential voltage is supplied to the counter electrode signal line portions CX2, CX4, . . . CXn from the right counter electrode signal drive circuit 3R. Accordingly, the brightness distribution is lowered leftward, and the brightness as a whole becomes slightly higher than the brightness indicated by the curve 20. A curve 22 indicated by a broken line in the drawing indicates the brightness distribution of the pixels over the whole display region 6 and is formed by synthesizing the curves 20 and 21. The curve 22 is slightly lowered leftward as shown in the drawing. This phenomenon implies that an image is slightly dark in the vicinity of the left edge of the display region 6.

FIG. 9B shows the brightness distribution in an even-numbered frame in the liquid crystal display device 1, and corresponds to FIG. 8B. In this case, the voltage value applied to the odd-numbered counter electrode signal line portions CX1, CX3, . . . CXn−1 and the voltage value applied to the even-numbered counter electrode signal line portions CX2, CX4, . . . CXn become opposite to the corresponding voltages values used in the odd-numbered frame and hence, the brightness of the pixels indicated by the curve 20 as a whole becomes slightly high, while the brightness of pixels indicated by the curve 21 as a whole becomes slightly low. As a result, a curve 23 which indicates the brightness distribution of the pixels over the whole display region 6 by a chained line becomes slightly lowered rightward. This phenomenon implies that an image is slightly dark in the vicinity of the right edge of the display region 6.

FIG. 9C is a graph which indicates the curve 22 in FIG. 9A and the curve 23 in FIG. 9B simultaneously. As shown in the graph, the brightness difference indicated by symbol 24 arises at edge portions of the display region 6. Since the curve 22 indicates the brightness distribution over the whole display region 6 in the odd-numbered frame and the curve 23 indicates the brightness distribution over the whole display region 6 in the even-numbered frame, eventually, in this liquid crystal display device 1, the brightness is changed by the brightness difference 24 at left and right edge portions of the display region 6 for every 1 frame. This phenomenon is observed as flickering at a screen edge.

The present invention has been made to overcome these drawbacks and it is an object of the present invention to reduce flicking at a screen edge in a liquid crystal display device in which a drive circuit is arranged on left and right sides of a display region in a two-split manner.

SUMMARY OF THE INVENTION

To briefly explain the summary of typical inventions among inventions described in this specification, they are as follows.

According to one aspect of the present invention, there is provided a liquid crystal display device which includes: a substrate; pixels which are formed on the substrate; a first counter electrode signal drive circuit which is arranged on one side of a region where the pixels are formed; a second counter electrode signal drive circuit which is arranged on the other side of the region where the pixels are formed; a plurality of counter electrode portions which are provided corresponding to the pixels; and a plurality of counter electrode signal lines which are made conductive with the counter electrode portions, extend in the X direction, are arranged parallel to each other in the Y direction which intersects with the X direction, and are connected to the first counter electrode signal drive circuit or the second counter electrode signal drive circuit, wherein during an arbitrary 1 frame period, the first counter electrode signal drive circuit applies a first voltage to first counter electrode signal lines and a second voltage which is different from the first voltage to second counter electrode signal lines, and the second counter electrode signal drive circuit applies a first voltage to third counter electrode signal lines and a second voltage to fourth counter electrode signal lines.

In the above-mentioned liquid crystal display device, during the arbitrary 1 frame period, four counter electrode signal lines which are arranged adjacent to each other in the Y direction are constituted of: the first counter electrode signal line which is connected to the first counter electrode signal drive circuit and to which the first voltage is applied; the second counter electrode signal line which is connected to the second counter electrode signal drive circuit and to which the first voltage is applied; the third counter electrode signal line which is connected to the first counter electrode signal drive circuit and to which the second voltage is applied; and the fourth counter electrode signal line which is connected to the second counter electrode signal drive circuit and to which the second voltage is applied.

In the above-mentioned liquid crystal display device, during the arbitrary 1 frame period, the counter electrode signal lines are arranged in the Y direction in order of the first counter electrode signal line, the second counter electrode signal line, the third counter electrode signal line and the fourth counter electrode signal line.

In the above-mentioned liquid crystal display device, during the arbitrary 1 frame period, the counter electrode signal lines are arranged in the Y direction in order of the first counter electrode signal line, the third counter electrode signal line, the second counter electrode signal line and the fourth counter electrode signal line.

In the above-mentioned liquid crystal display device, during the arbitrary 1 frame period, the counter electrode signal lines are arranged in the Y direction in order of the first counter electrode signal line, the third counter electrode signal line, the fourth counter electrode signal line and the second counter electrode signal line.

According to the inventions described in this specification, in the liquid crystal display device in which the drive circuit is arranged on left and right sides of the display region in a two-split manner, it is possible to reduce flickering at a display edge.

DETAIL DESCRIPTION OF THE EMBODIMENTS

Hereinafter, a first preferred embodiment of the present invention is explained in conjunction with FIG. 1 to FIG. 4B.

Figure 1:
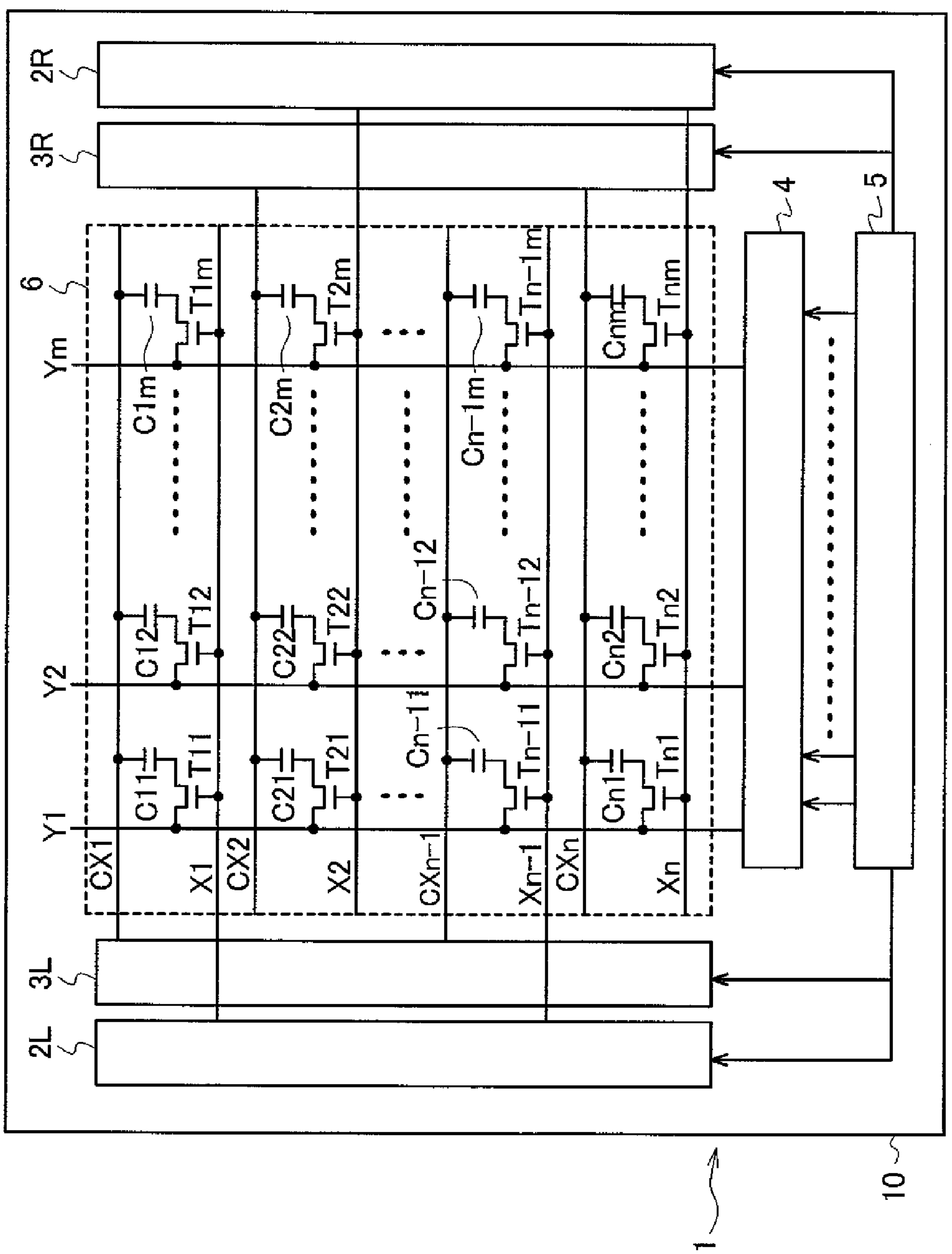
FIG. 1 is an overall circuit diagram showing a circuit arrangement of a liquid crystal display device according to a first embodiment.

FIG. 1 is an overall circuit diagram showing a circuit arrangement of a liquid crystal display device 1 according to this embodiment. The liquid crystal display device 1 according to this embodiment includes n×m pieces of pixels (n pieces of pixels in the longitudinal direction and m pieces of pixels in the lateral direction). A circuit shown in FIG. 1 is formed on a TFT substrate 10 which is constituted of a transparent substrate made of glass or the like. A scanning signal drive circuit 2L, 2R and a counter electrode signal drive circuit 3L, 3R are arranged on left and right sides of a display region 6 respectively. n/2 pieces of scanning signal lines X1, X3, . . . Xn−1 which extend in the lateral direction from the scanning signal drive circuit 2L arranged on a left side of the display region 6 are arranged parallel to each other in the longitudinal direction as shown in the drawing. In the same manner, n/2 pieces of counter electrode signal line portions CX1, CX3, . . . CXn−1 which extend in the lateral direction from the counter electrode signal drive circuit 3L arranged on a left side of the display region 6 are arranged parallel to each other in the longitudinal direction as shown in the drawing. n/2 pieces of scanning signal lines X2, X4, . . . Xn which extend in the lateral direction from the scanning signal drive circuit 2R arranged on a right side of the display region 6 are arranged parallel to each other in the longitudinal direction as shown in the drawing. In the same manner, n/2 pieces of counter electrode signal line portions CX2, CX4, . . . CXn which extend in the lateral direction from the counter electrode signal drive circuit 3R arranged on a right side of the display region 6 are arranged parallel to each other in the longitudinal direction as shown in the drawing. Further, m pieces of video signal lines Y1 to Ym which extend in the longitudinal direction from a distribution circuit 4 are arranged parallel to each other in the lateral direction as shown in the drawing. Regions which are surrounded by the scanning signal lines X1 to Xn and the video signal lines Y1 to Ym constitute pixels, and a holding capacitance C11, C12, . . . Cnm which is generated by a pixel electrode and a counter electrode portion is formed in each pixel. Further, a transistor T11, T12, . . . Tnm is formed in each pixel. Each transistor T11, T12, . . . Tnm has a source thereof connected to the pixel electrode, a drain thereof connected to the video signal line Y1, Y2, . . . Ym, and a gate thereof connected to the scanning signal line X1, X2, . . . Xn . The respective counter electrode portions are made electrically conductive with the counter electrode signal line portions CX1 to CXn. Here, the connection of the each transistors T11, T12, . . . Tnm with the pixel electrode and the video signal line Y1, Y2, . . . Ym may be exchanged. The scanning signal drive circuits 2L, 2R, the counter electrode signal drive circuits 3L, 3R and the distribution circuit 4 are connected to a driver circuit 5. The driver circuit 5 outputs various control signals to the scanning signal drive circuits 2L, 2R and the counter electrode signal drive circuits 3L, 3R, and outputs video signals to the distribution circuit 4.

In the liquid crystal display device 1 having such a constitution, the scanning in the longitudinal direction is performed in response to scanning signals which are outputted to the scanning signal lines X1 to Xn from the scanning signal drive circuits 2L, 2R. That is, when a voltage having a high potential is applied to the scanning signal line of a particular column, for example, the scanning signal line X1 and a voltage having a low potential is applied to remaining scanning signal lines X2 to Xn, the transistors T11 to Tlm which are connected to the scanning signal line X1 are turned on. Here, a voltage corresponding to a video signal which is outputted to the video signal lines Y1 to Ym from the distribution circuit 4 is written in the holding capacitances C11 to C1*m*. Subsequently, when a voltage having a high potential is applied to the scanning signal line X2 and a voltage having a low potential is applied to the remaining scanning signal lines X1, X3 to Xn, a voltage corresponding to the video signal is written in the holding capacitances C21 to C2*m*. By repeating the above-mentioned operation in the same manner hereinafter, a voltage corresponding to the video signal is written in all holding capacitances C11 to Cnm. The alignment direction of a liquid crystal layer is changed in response to such voltages so that optical transmissivity of liquid crystal is controlled thus forming an image.

In the liquid crystal display device 1 of this embodiment, both the pixel electrodes and the counter electrode portions are formed on the TFT substrate 10. This is because the liquid crystal display device 1 is of a lateral-electric field type which is referred to as an IPS (In-Plane Switching) type. In a vertical-electric-field type liquid crystal display device such as a VA (Vertical Alignment) type or a TN (Twisted Nematic) type liquid crystal display device, as described later, pixel electrodes are formed on a TFT substrate 10 and counter electrode portions are formed on a color filter substrate which faces the TFT substrate 10 in an opposed manner with a liquid crystal layer sandwiched therebetween.

Figure 2:
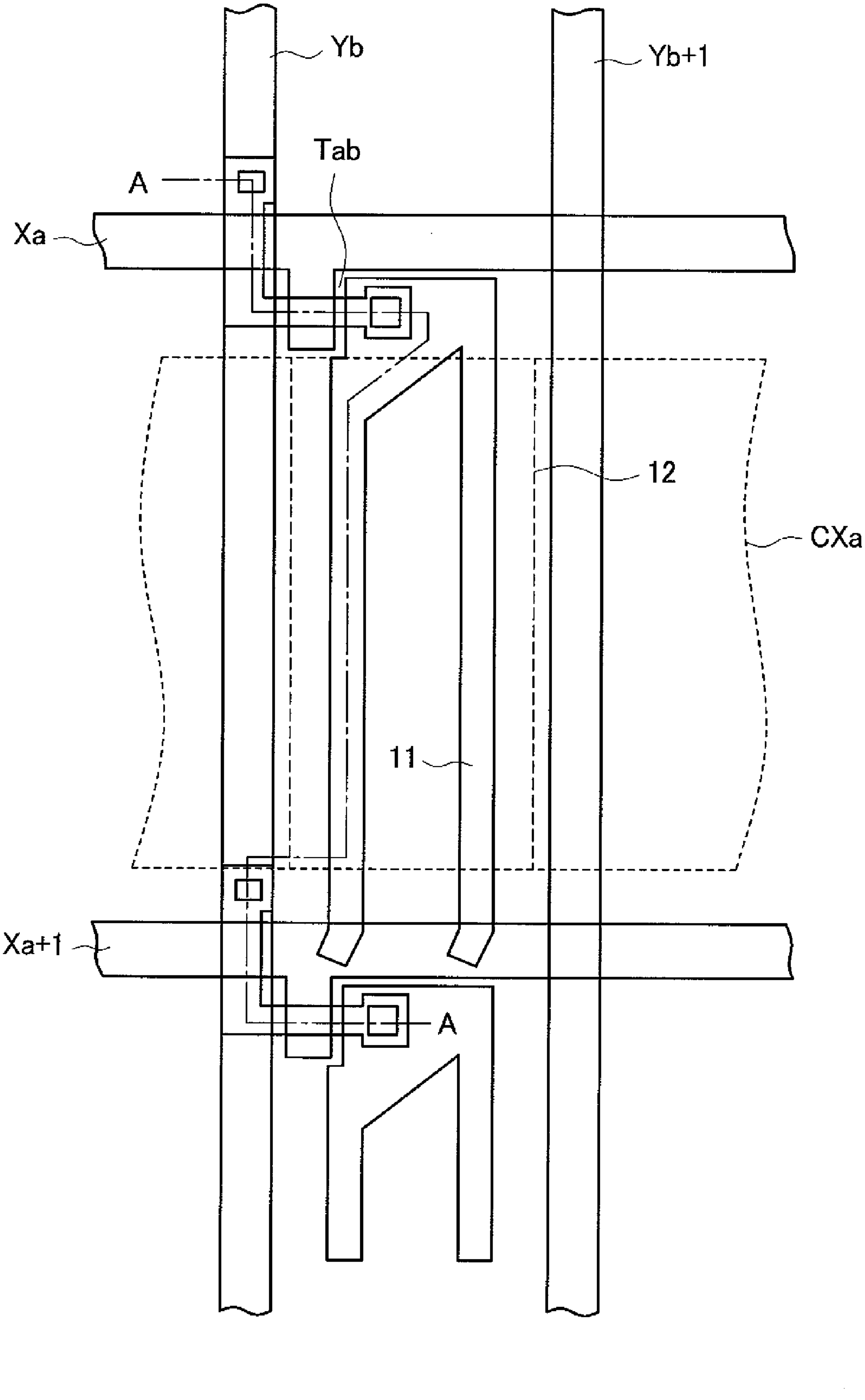
FIG. 2 is an enlarged view of a pixel portion of the liquid crystal display device according to the first embodiment.
Figure 3:
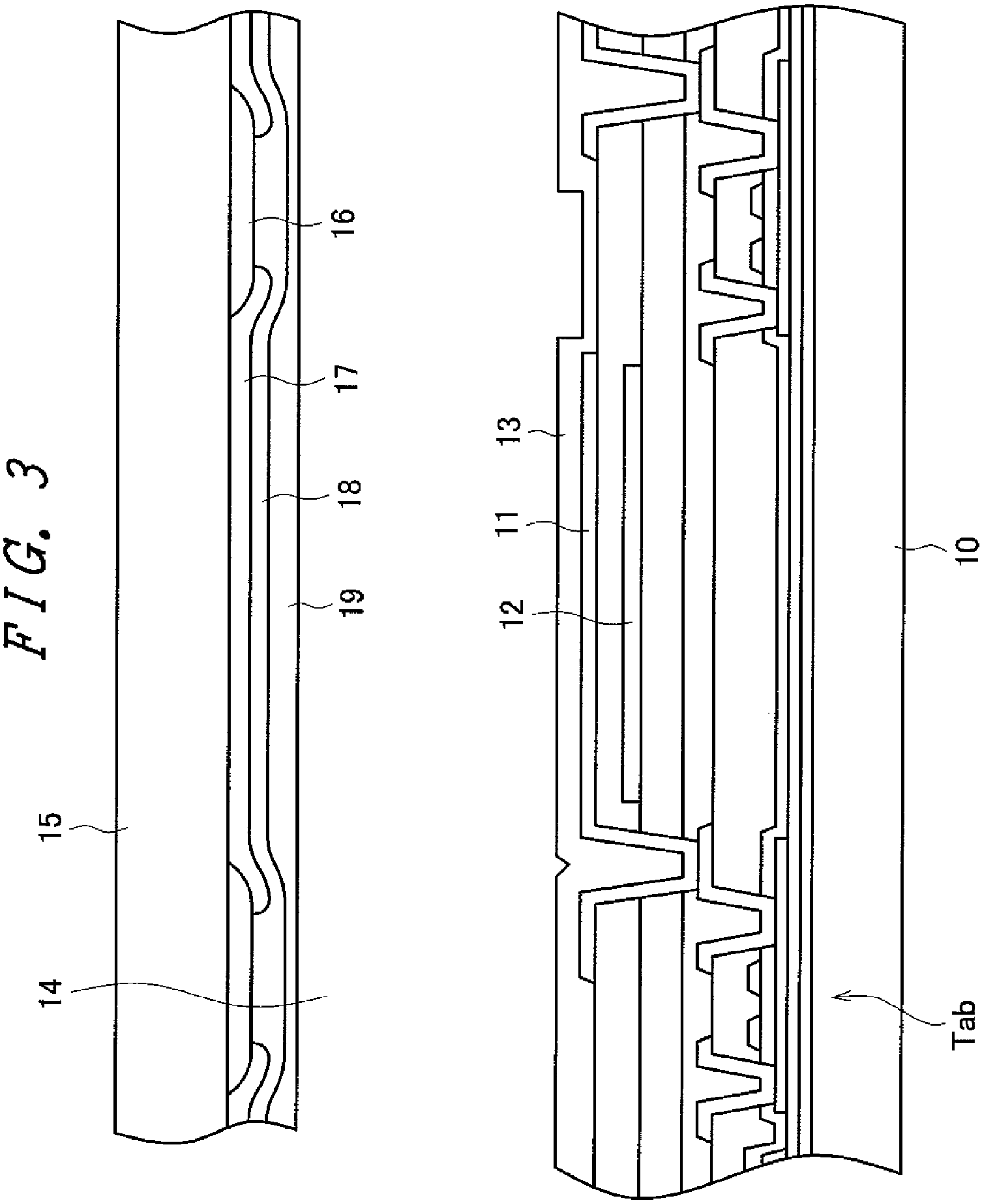
FIG. 3 is a cross-sectional view taken along a line A-A in FIG. 2.

FIG. 2 is an enlarged view of a pixel portion of the liquid crystal display device 1 according to this embodiment, and FIG. 3 is a cross-sectional view of the pixel portion taken along a line A-A in FIG. 2. In FIG. 2 and FIG. 3, although the pixel which is counted as an a-th pixel in the longitudinal direction and is counted as a b-th pixel in the lateral direction is shown, other pixels also have the substantially same constitution.

As shown in FIG. 2, the scanning signal lines Xa, Xa+1 and the video signal lines Yb, Yb+1 are formed on the TFT substrate 10, and the region surrounded by these lines constitutes the pixel. The transistor Tab is formed in the vicinity of an intersection of the scanning signal line Xa and the video signal line Yb. In this embodiment, the transistor Tab is an nMOS-type thin film transistor. A comb-teeth-shaped pixel electrode 11 is connected to the source of the transistor Tab. The counter electrode signal line portion CXa which is indicated by a dotted line is arranged below the pixel electrode 11. Out of the counter electrode signal line portion CXa, a region which is positioned within the pixel indicated by a chained line constitutes the counter electrode portion 12 which functions as a counter electrode of this pixel. That is, a plurality of counter electrode portions 12 are provided for pixels respectively and the counter electrode signal line portion CXa is made electrically conductive with the plurality of these counter electrode portions 12. Here, it may be possible to provide the structure where the counter electrode portion 12 is formed for every pixel as an independent counter electrode, the counter electrode signal line portion CXa is formed as a counter electrode signal line having a narrow width substantially equal to a width of the scanning signal line Xa, and the counter electrode signal line and the counter electrode may be additionally connected to each other.

In FIG. 3, the transistor Tab, the pixel electrode 11, the counter electrode portion 12, and an alignment film 13 which are formed on the TFT substrate 10 are shown, and an insulation film is suitably formed between the respective components. Further, the color filter substrate 15 is arranged on the TFT substrate 10 with the liquid crystal layer 14 sandwiched therebetween. A black matrix 16, a color filter layer 17, a leveling film 18 and an alignment film 19 are formed on the color filter substrate 15. Here, the leveling film 18 may be omitted if unnecessary.

Here, considered is a cause which generates flicking at an edge portion of the above-mentioned display region 6. In a state where the liquid crystal display device 1 is operated, the counter electrode signal line portions CX1 to CXn assume any one of the following 4 states (a) to (d).

(a) The counter electrode signal line portion CX1, CX2, . . . CXn is connected to the counter electrode signal drive circuit 3L and assumes a high potential.

(b) The counter electrode signal line portion CX1, CX2, . . . CXn is connected to the counter electrode signal drive circuit 3R and assumes a high potential.

(c) The counter electrode signal line portion CX1, CX2, . . . CXn is connected to the counter electrode signal drive circuit 3L and assumes a low potential.

(d) The counter electrode signal line portion CX1, CX2, . . . CXn is connected to the counter electrode signal drive circuit 3R and assumes a low potential.

Then, the brightness distributions which the pixels corresponding to the counter electrode signal line portions CX1 to CXn exhibit respectively in the lateral direction of the display region 6 differ from each other with respect to the respective states (a) to (d).

Accordingly, when the deviation exists in the distribution of the states of the counter electrode signal line portions CX1 to CXn in a specified frame, this deviation brings about the deviation of the brightness distribution within the display region 6. Further, when the difference exists between the odd-numbered frame and the even-numbered frame with respect to the states of distribution of the counter electrode signal line portions CX1 to CXn, the brightness distribution within the display region 6 is changed for every 1 frame and this change is observed as flickering.

That is, by uniformly distributing the states of the counter electrode signal line portions CX1 to CXn with respect to the states (a) to (d) for every frame, it is possible to reduce flickering.

For this end, during an arbitrary 1 frame period, it is necessary to allow the counter electrode signal drive circuit 3L to apply a high voltage which is a first voltage to at least one counter electrode signal line portion CX1, CX3, . . . CXn−1 and a low voltage which is a second voltage to at least one counter electrode signal line portion CX1, CX3, . . . CXn−1, and it is also necessary to allow the counter electrode signal drive circuit 3R to apply a high voltage which is a first voltage to at least one counter electrode signal line portion CX2, CX4, . . . CXn and a low voltage which is a second voltage to at least one counter electrode signal line portion CX2, CX4, . . . CXn.

In other words, during an arbitrary 1 frame period, at least one or more counter electrode signal line portions CX1, CX2, . . . CXn which assume the above-mentioned states (a) to (d) never fail to exist with respect to each state.

Further, to reduce the deviation of distribution of the states of counter electrode signal line portions CX1 to CXn, it is desirable to distribute the counter electrode signal line portions CX1 to CXn into the above-mentioned states (a) to (d) as uniform as possible. That is, during an arbitrary 1 frame period, it is desirable that the number of the counter electrode signal line portions CX1 to CXn is substantially equal with respect to the above-mentioned respective states (a) to (d). When n is a multiple of 4, it is possible to set the number of counter electrode signal line portions CX1 to CXn equal with respect to the above-mentioned respective states (a) to (d).

Further, to reduce the deviation of the brightness distribution within the display region 6, particularly the deviation of the brightness distribution in the vertical direction, it is also desirable that the distribution of the counter electrode signal line portions CX1 to CXn in the above-mentioned states (a) to (d) within the display region 6 is uniform. To realize such brightness distribution, during an arbitrary 1 frame period, when four arbitrary counter electrode signal line portions which are arranged adjacent to each other in the vertical direction are taken out from the counter electrode signal line portions CX1 to CXn, such arbitrary counter electrode signal line portions contain all of the above-mentioned states (a) to (d).

This embodiment is one example of the arrangement and the control of the counter electrode signal line portions CX1 to CXn which include all of the above-mentioned states (a) to (d) when four arbitrary counter electrode signal line portions which are arranged adjacent to each other in the vertical direction are taken out from the counter electrode signal line portions CX1 to CXn during an arbitrary 1 frame period.

Figure 4A:
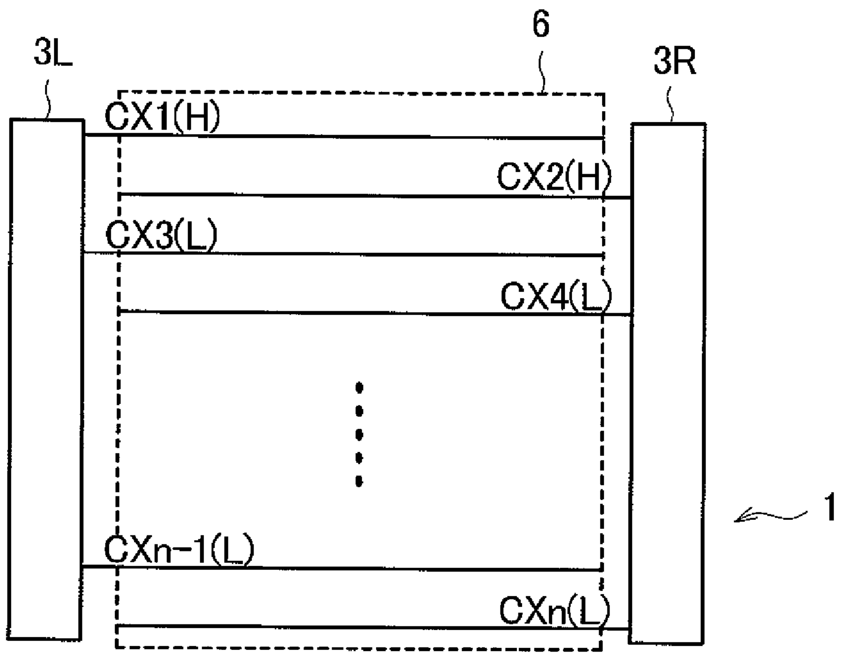
FIG. 4A and FIG. 4B are views schematically showing the liquid crystal display device according to the first embodiment.
Figure 4B:
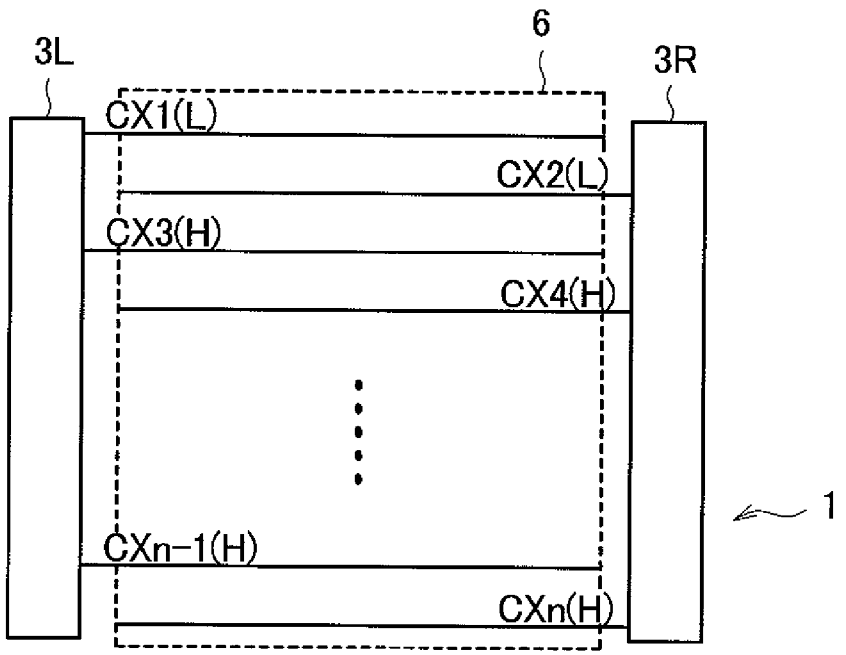
Figure 8A:
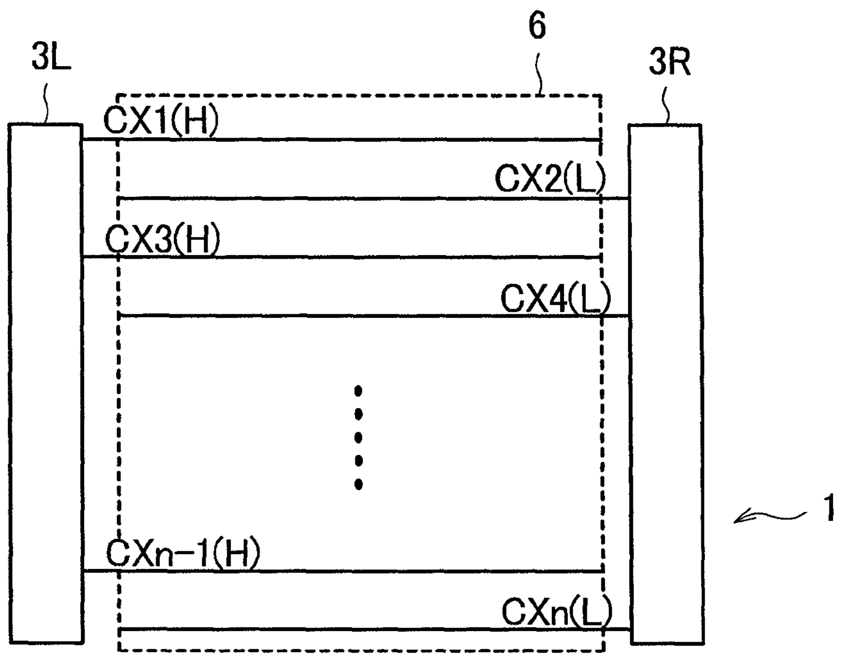
FIG. 8A (Prior Art)
FIG. 8A and FIG. 8B are views schematically showing a liquid crystal display device which adopts a line inversion method and arranges a drive circuit on left and right sides of a display region in a two-split manner.
Figure 8B:
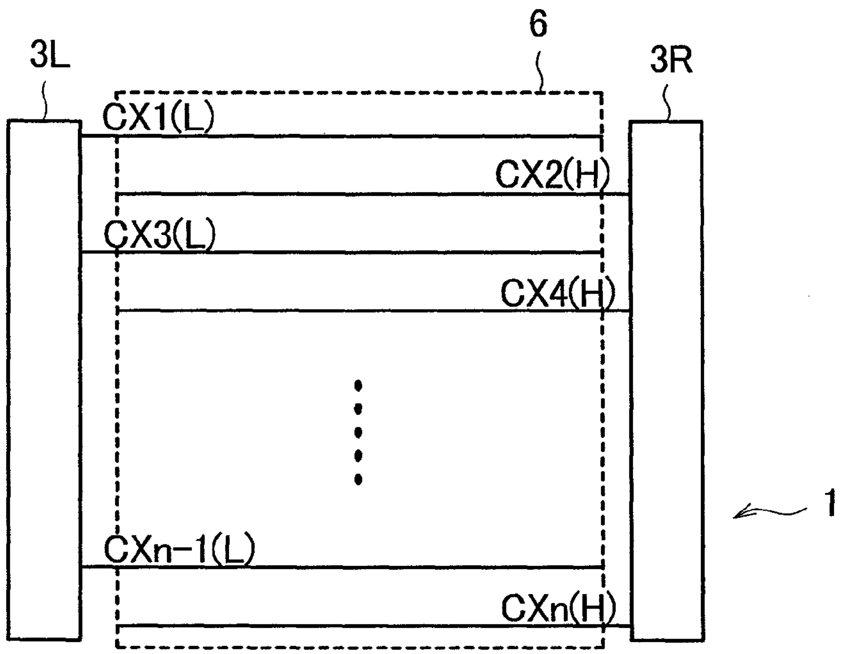
FIG. 8B (Prior Art)
Figure 9A:
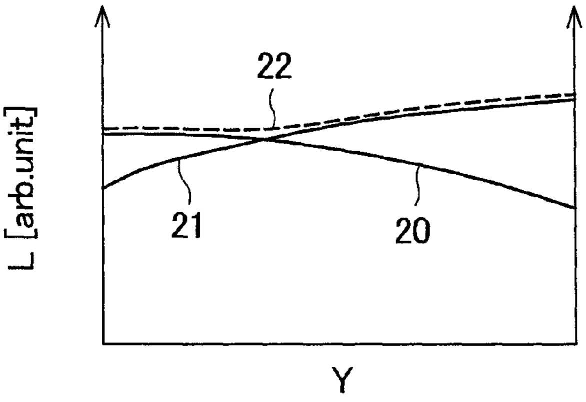
FIG. 9A (Prior Art)
FIG. 9A to FIG. 9C are views showing the brightness distribution of pixels in the lateral direction of the liquid crystal display device shown in FIG. 8.
Figure 9B:
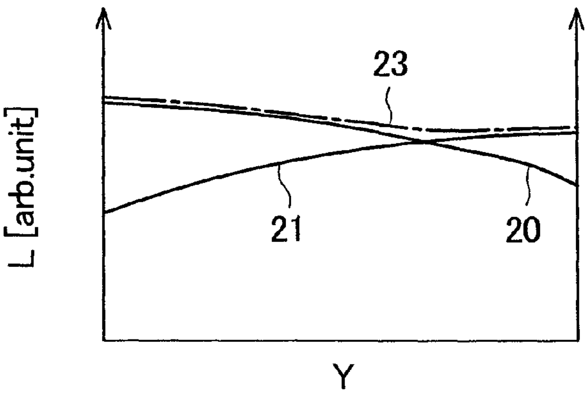
FIG. 9B (Prior Art)
Figure 9C:
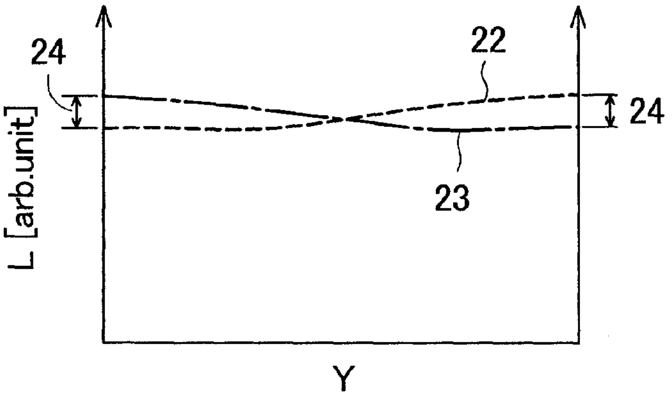
FIG. 9C (Prior Art)

FIG. 4A and FIG. 4B are schematic views of the liquid crystal display device 1 according to this embodiment. Symbols shown in FIG. 4A and FIG. 4B and meanings of these symbols substantially follow symbols and meanings of these symbols explained in conjunction with FIG. 8A and FIG. 8B. Accordingly, the explanation of the symbols shown in FIG. 4A and FIG. 4B and meanings of these symbols is omitted.

As shown in FIG. 4A, in an odd-numbered frame, the counter electrode signal line portions CX1 to CXn are arranged in order of states (a), (b), (c), (d) from the counter electrode signal line portion CX1 at an upper edge of the display region 6, and the arrangement of the counter electrode signal line portions of this order is repeated until the counter electrode signal line portion CXn. Due to such arrangement, irrelevant to a position at which four arbitrary counter electrode signal line portions arranged adjacent to each other are taken out from the counter electrode signal line portions CX1 to CXn, these four counter electrode signal line portions never fail to contain at least one of the state (a), at least one of the state (b), at least one of the state (c) and at least one of the state (d).

Then, as shown in FIG. 4B, in an even-numbered frame, the counter electrode signal line portions CX1 to CXn are arranged in order of states (c), (d), (a), (b) from the counter electrode signal line portion CX1 at the upper edge of the display region 6, and the arrangement of the counter electrode signal line portions of this order is repeated until the counter electrode signal line portion CXn. Also in this case, in the same manner as the odd-numbered frame, irrelevant to a position at which four arbitrary counter electrode signal line portions arranged adjacent to each other are taken out from the counter electrode signal line portions CX1 to CXn, these four counter electrode signal line portions never fail to contain at least one of the state (a), at least one of the state (b), at least one of the state (c) and at least one of the state (d). Here, in the even-numbered frame, by taking out the counter electrode signal line portions CX2 to CX5 as four arbitrary counter electrode signal line portions CX1 to CXn, the counter electrode signal line portions CX2 to CX5 are arranged in order of states (a), (b), (c), (d) and this arrangement becomes equal to the arrangement in the odd-numbered frame.

By adopting such arrangement, it is possible to eliminate the difference in brightness distribution between the odd-numbered frame and the even-numbered frame. Accordingly, it is possible to eliminate flickering of the screen generated by the previously-mentioned cause. Further, the deviation of brightness distribution within the display region 6 becomes also small even in one arbitrary frame.

In this embodiment, with respect to the arrangement of the scanning signal lines X1 to Xn, in the same manner as the counter electrode signal line portions CX1 to CXn, the odd-numbered scanning signal lines X1, X3, . . . Xn−1 as counted from above are connected to the scanning signal drive circuit 2L on a left side of the display region 6, and the even-numbered scanning signal lines X2, X4, . . . Xn as counted from above are connected to the scanning signal drive circuit 2R on a right side of the display region 6. However, the arrangement of the scanning signal lines X1 to Xn is not particularly limited and any arbitrary arrangement may be adopted. For example, the scanning signal lines X1 to Xn may be arranged opposite to the arrangement of this embodiment in the lateral direction, or the arrangement where the scanning signal lines X1 to Xn are connected to the scanning signal drive circuits 2L, 2R on left and right sides for every two other scanning signal lines may be adopted. Further, the scanning signal drive circuit may be arranged only one of left and right sides of the display region 6, and all scanning signal lines X1 to Xn may be connected to the scanning signal drive circuit arranged on the left or right side of the display region 6. The same goes for other embodiments explained hereinafter.

Figure 5A:
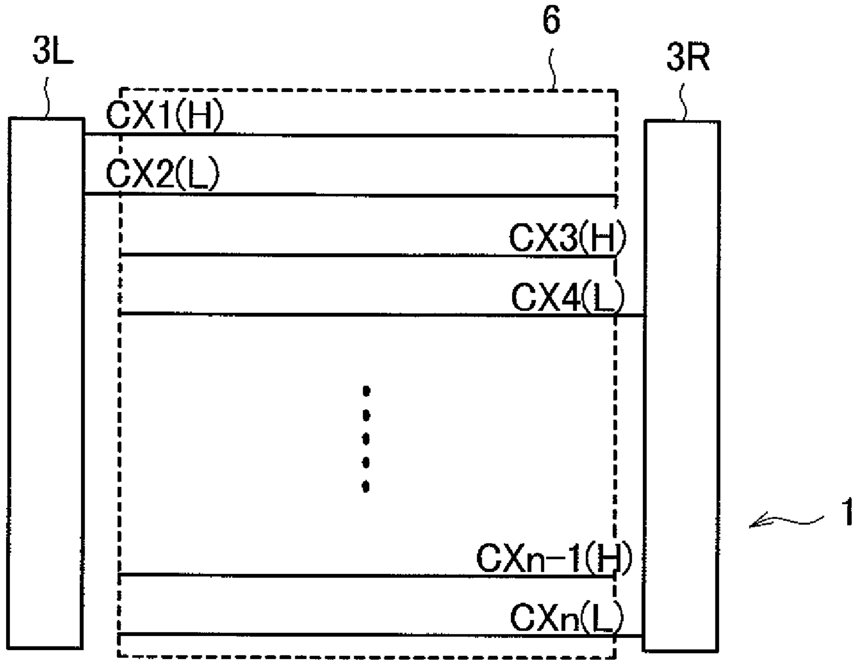
FIG. 5A and FIG. 5B are views schematically showing a liquid crystal display device according to a second embodiment.
Figure 5B:
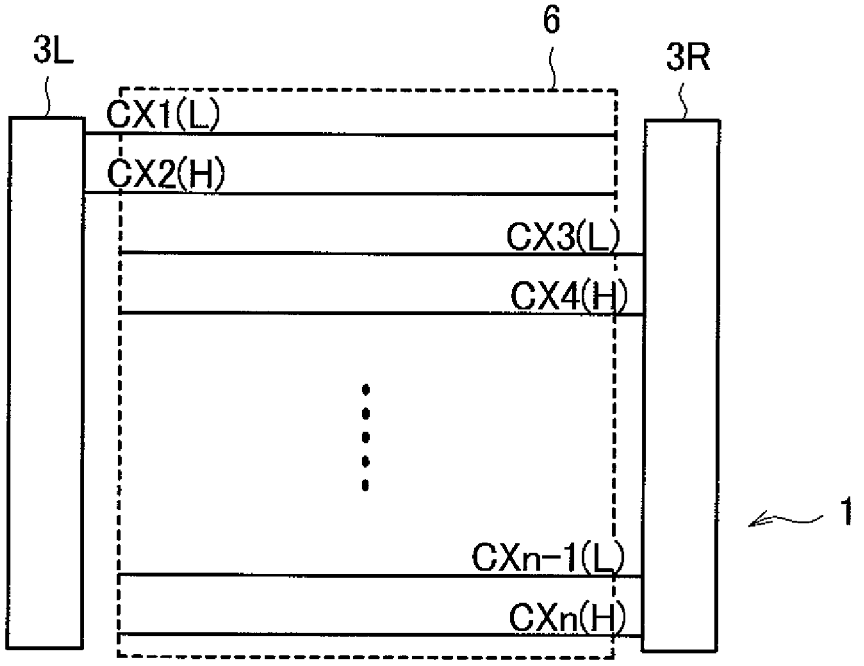

FIG. 5A and FIG. 5B are schematic views of the liquid crystal display device 1 according to a second preferred embodiment of the present invention. Symbols shown in FIG. 5A and FIG. 5B and meanings of these symbols substantially follow symbols and meanings of these symbols already explained in conjunction with FIG. 8A and FIG. 8B. Accordingly, the explanation of the symbols shown in FIG. 5A and FIG. 5B and meanings of these symbols is omitted. This embodiment differs from the first embodiment only with respect to the arrangement of the states of the counter electrode signal line portions CX1 to CXn and is substantially equal to the first embodiment with respect to other points.

In this embodiment, as shown in FIG. 5A, in an odd-numbered frame, the counter electrode signal line portions CX1 to CXn are arranged in order of states (a), (c), (b), (d) from the counter electrode signal line portion CX1 at an upper edge of the display region 6, and the arrangement of the counter electrode signal line portions of this order is repeated until the counter electrode signal line portion CXn. Also due to such arrangement, irrelevant to a position at which four arbitrary counter electrode signal line portions arranged adjacent to each other are taken out from the counter electrode signal line portions CX1 to CXn, these four counter electrode signal line portions never fail to contain at least one of the state (a), at least one of the state (b), at least one of the state (c) and at least one of the state (d).

Then, as shown in FIG. 5B, in an even-numbered frame, the counter electrode signal line portions CX1 to CXn are arranged in order of states (c), (a), (d), (b) from the counter electrode signal line portion CX1 at the upper edge of the display region 6, and the arrangement of the counter electrode signal line portions of this order is repeated until the counter electrode signal line portion CXn. Also in this case, in the same manner as the odd-numbered frame, irrelevant to a position at which four arbitrary counter electrode signal line portions arranged adjacent to each other are taken out from the counter electrode signal line portions CX1 to CXn, these four counter electrode signal line portions never fail to contain at least one of the state (a), at least one of the state (b), at least one of the state (c) and at least one of the state (d). Here, in the even-numbered frame, by taking out the counter electrode signal line portions CX2 to CX5 as four arbitrary counter electrode signal line portions CX1, CX2, . . . CXn arranged adjacent to each other in the reverse manner in order of CX5 to CX2, the counter electrode signal line portions CX5 to CX2 are arranged in order of states (a), (c), (b), (d).

By adopting such arrangement, it is possible to eliminate the difference in brightness distribution between the odd-numbered frame and the even-numbered frame. Accordingly, it is possible to eliminate flickering of the screen generated by the previously-mentioned cause. Further, the deviation of brightness distribution within the display region 6 becomes also small even in one arbitrary frame.

Figure 6A:
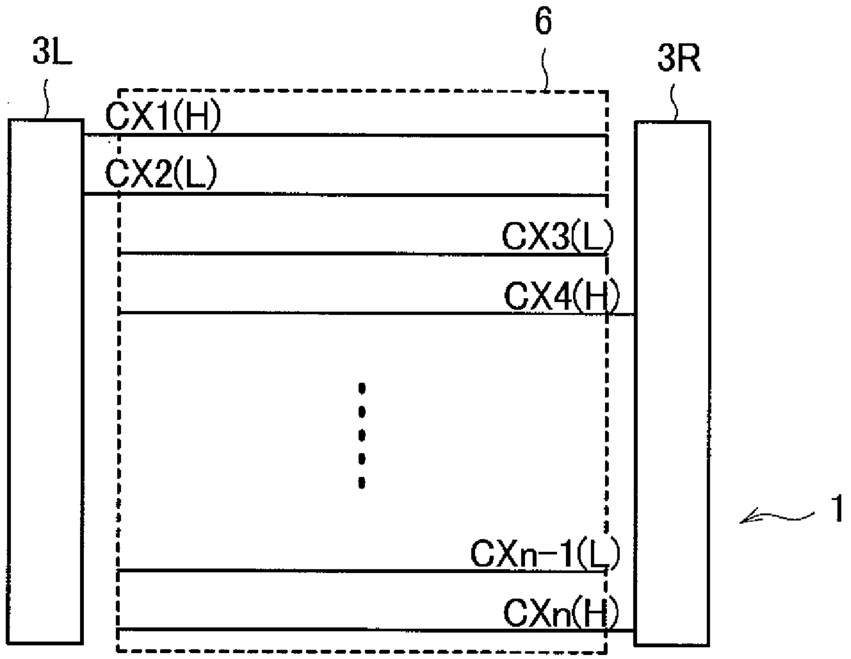
FIG. 6A and FIG. 6B are views schematically showing a liquid crystal display device according to a third embodiment.
Figure 6B:
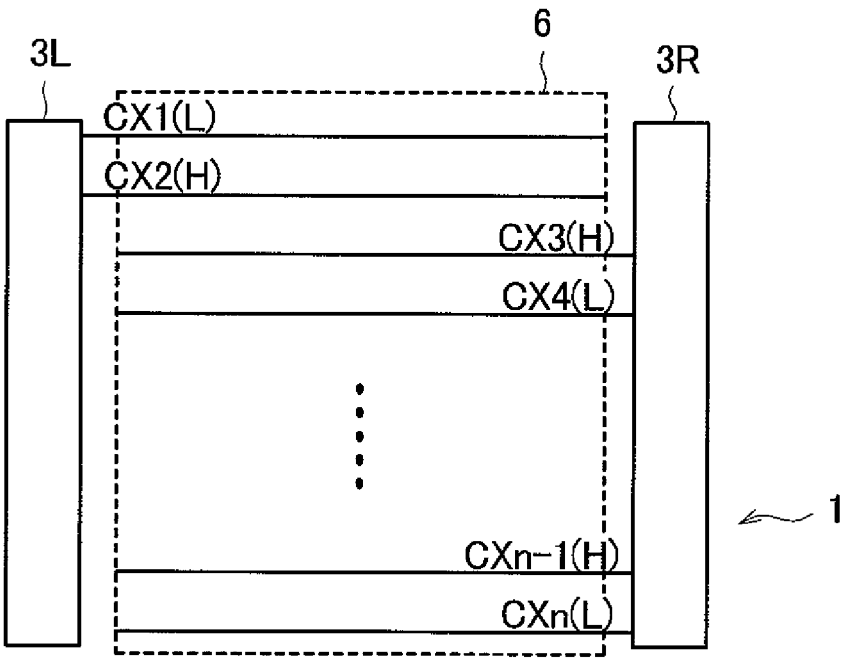

FIG. 6A and FIG. 6B are schematic views of the liquid crystal display device 1 according to a third preferred embodiment of the present invention. Symbols shown in FIG. 6A and FIG. 6B and meanings of these symbols substantially follow symbols and meanings of these symbols already explained in conjunction with FIG. 8A and FIG. 8B. Accordingly, the explanation of the symbols shown in FIG. 6A and FIG. 6B and meanings of these symbols is omitted. This embodiment also differs from the first embodiment only with respect to the arrangement of the states of the counter electrode signal line portions CX1 to CXn and is substantially equal to the first embodiment with respect to other points.

In this embodiment, as shown in FIG. 6A, in an odd-numbered frame, the counter electrode signal line portions CX1 to CXn are arranged in order of states (a), (c), (d), (b) from the counter electrode signal line portion CX1 at an upper edge of the display region 6, and the arrangement of the counter electrode signal line portions of this order is repeated until the counter electrode signal line portion CXn. Also due to such arrangement, irrelevant to a position at which four arbitrary counter electrode signal line portions arranged adjacent to each other are taken out from the counter electrode signal line portions CX1 to CXn, these four counter electrode signal line portions never fail to contain at least one of the state (a), at least one of the state (b), at least one of the state (c) and at least one of the state (d).

Then, as shown in FIG. 6B, in an even-numbered frame, the counter electrode signal line portions CX1 to CXn are arranged in order of states (c), (a), (b), (d) from the counter electrode signal line portion CX1 at the upper edge of the display region 6, and the arrangement of the counter electrode signal line portions of this order is repeated until the counter electrode signal line portion CXn. Also in this case, in the same manner as the odd-numbered frame, irrelevant to a position at which four arbitrary counter electrode signal line portions arranged adjacent to each other are taken out from the counter electrode signal line portions CX1 to CXn, these four counter electrode signal line portions never fail to contain at least one of the state (a), at least one of the state (b), at least one of the state (c) and at least one of the state (d). Here, in the even-numbered frame, by taking out the counter electrode signal line portions CX2 to CX5 as four arbitrary counter electrode signal line portions CX1, CX2, . . . CXn arranged adjacent to each other in the reverse manner in order of CX5 to CX2, the counter electrode signal line portions CX2 to CX5 are arranged in order of states (a), (c), (d), (b).

By adopting such arrangement, it is possible to eliminate the difference in brightness distribution between the odd-numbered frame and the even-numbered frame. Accordingly, it is possible to eliminate flickering of the screen generated by the previously-mentioned cause. Further, the deviation of brightness distribution within the display region 6 becomes also small even in one arbitrary frame.

Figure 7:
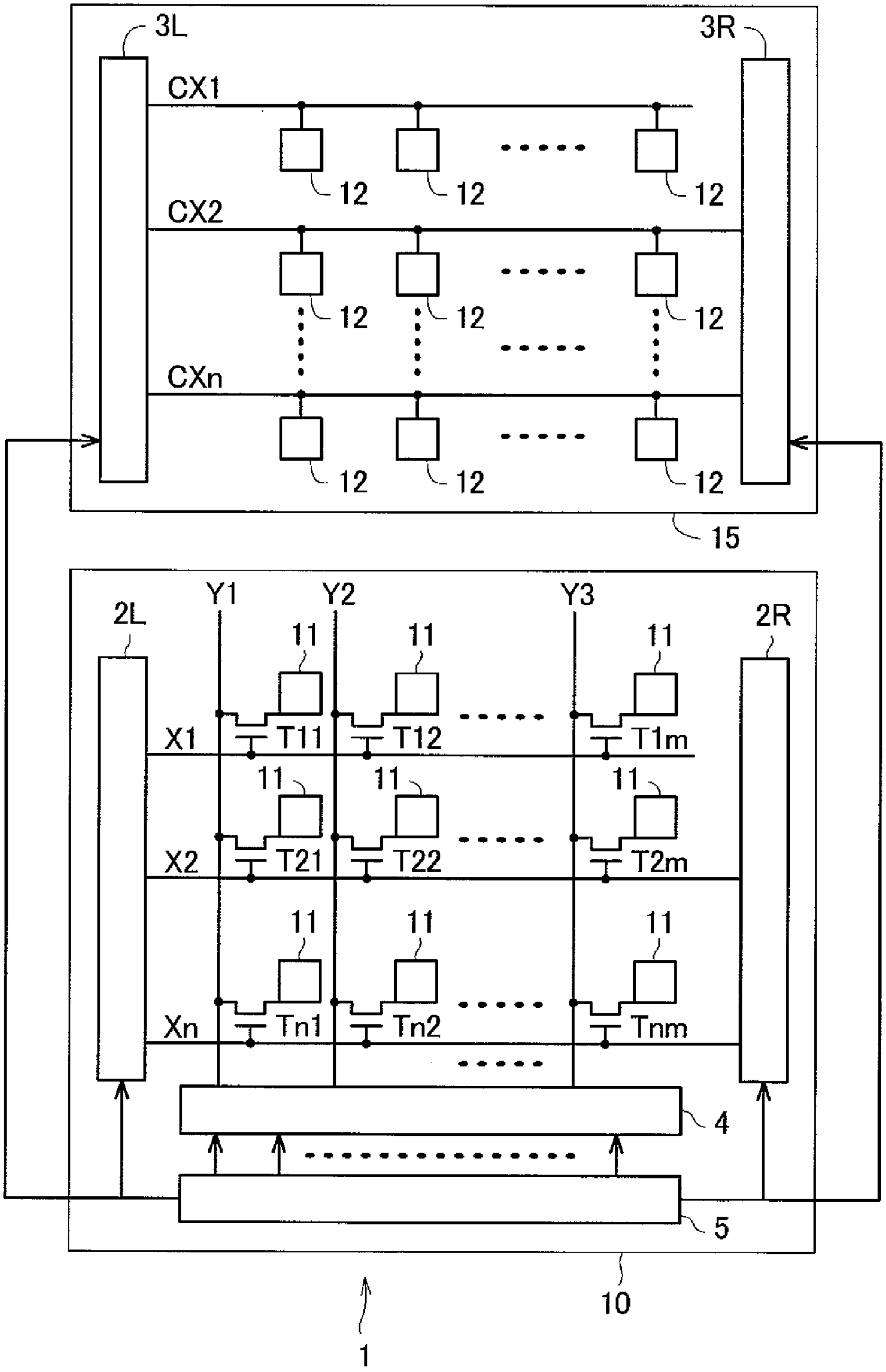
FIG. 7 is an overall circuit diagram showing the circuit arrangement of a liquid crystal display device according to a fourth embodiment.

FIG. 7 is an overall circuit diagram showing the circuit arrangement of a liquid crystal display device 1 according to a fourth preferred embodiment of the present invention. This embodiment is substantially equal to the first embodiment except for that the liquid crystal display device 1 is of a vertical-electric-field-type liquid crystal display device such as a VA-type or TN-type liquid crystal display device and hence, the constitution adopted in common with the first embodiment 1 are given the same symbols and the detailed explanation of the constitution is omitted.

In the vertical-electric-field-type liquid crystal display device 1, counter electrode portions 12 are formed on a color filter substrate 15. Accordingly, scanning signal drive circuits 2L, 2R are formed on a TFT substrate 10, and counter electrode signal drive circuits 3L, 3R are not formed on the TFT substrate 10. Further, the counter electrode signal drive circuits 3L, 3R, counter electrode signal line portions CX1 to CXn and counter electrode portions 12 are formed on the color filter substrate 15. When the liquid crystal display device 1 is assembled, pixel electrodes 11 formed on the TFT substrate 10 and the counter electrode portions 12 formed on the color filter substrate 15 are arranged to face each other in an opposed manner while interposing a liquid crystal layer 14 therebetween thus forming holding capacitances C11 to Cnm.

Due to such a constitution, also in the vertical-electric-field-type liquid crystal display device 1, in the same manner as the first embodiment, it is possible to eliminate the difference in brightness distribution between the odd-numbered frame and the even-numbered frame. Accordingly, it is possible to eliminate flickering of a screen. Further, the deviation of brightness distribution within a screen becomes small even in one arbitrary frame. Further, the scanning signal drive circuits 2L, 2R and the counter electrode signal drive circuits 3L, 3R are arranged on the different substrates. Accordingly, in a state where the liquid crystal display device 1 is assembled, it is possible to arrange the scanning signal drive circuits 2L, 2R and the counter electrode signal drive circuits 3L, 3R at positions where the scanning signal drive circuits 2L, 2R and the counter electrode signal drive circuits 3L, 3R overlap with each other whereby an area which these circuits occupy in the liquid crystal display device 1 becomes small.

What is claimed is:

1. A liquid crystal display device comprising:

a substrate;

pixels which are formed on the substrate;

a first counter electrode signal drive circuit which is arranged on one side of a region where the pixels are formed;

a second counter electrode signal drive circuit which is arranged on the other side of the region where the pixels are formed;

a plurality of counter electrode portions which are provided corresponding to the pixels; and a plurality of counter electrode signal lines which are made conductive with the counter electrode portions, extend in the X direction, are arranged parallel to each other in the Y direction which intersects with the X direction, and are connected to the first counter electrode signal drive circuit or the second counter electrode signal drive circuit wherein the plurality of counter electrode signal lines include first and second counter electrode signal lines which are electrically connected with the first counter electrode signal drive circuit and which are not electrically connected with the second counter electrode signal drive circuit and third and fourth counter electrode signal lines which are electrically connected with the second counter electrode signal drive circuit and which are not electrically connected with the first counter electrode signal drive circuit; and wherein during an arbitrary 1 frame period, the first counter electrode signal drive circuit applies a first voltage to the first counter electrode signal lines and a second voltage to the second counter electrode signal lines, and the second counter electrode signal drive circuit applies a first voltage to the third counter electrode signal lines and a second voltage to the fourth counter electrode signal lines.

2. A liquid crystal display device according to claim 1, wherein, during the arbitrary 1 frame period, the counter electrode signal lines are arranged in the Y direction in order of the first counter electrode signal line, the second counter electrode signal line, the third counter electrode signal line and the fourth counter electrode signal line.

3. A liquid crystal display device according to claim 1, wherein, during the arbitrary 1 frame period, the counter electrode signal lines are arranged in the Y direction in order of the first counter electrode signal line, the third counter electrode signal line, the second counter electrode signal line and the fourth counter electrode signal line.

4. A liquid crystal display device according to claim 1, wherein, during the arbitrary 1 frame period, the counter electrode signal lines are arranged in the Y direction in order of the first counter electrode signal line, the third counter electrode signal line, the fourth counter electrode signal line and the second counter electrode signal line.

* * * * *